(12) United States Patent
Sakurai et al.

(10) Patent No.: US 8,068,094 B2
(45) Date of Patent: Nov. 29, 2011

(54) POINTING DEVICE, INFORMATION DISPLAY DEVICE, AND INPUT METHOD UTILIZING THE POINTING DEVICE

(75) Inventors: Satoshi Sakurai, Shinagawa (JP); Nobuo Yatsu, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1798 days.

(21) Appl. No.: 11/181,893

(22) Filed: Jul. 15, 2005

(65) Prior Publication Data

US 2006/0012572 A1    Jan. 19, 2006

(30) Foreign Application Priority Data

Jul. 15, 2004   (JP) ................. 2004-208471

(51) Int. Cl.
*G09G 5/08* (2006.01)
(52) U.S. Cl. ......... 345/157; 345/156; 345/159; 345/184
(58) Field of Classification Search .......... 345/156–179; 178/19.01–19.09
See application file for complete search history.

(56) References Cited

U.S. PATENT DOCUMENTS

| | | | | |
|---|---|---|---|---|
| 5,790,820 A | * | 8/1998 | Vayda et al. | 715/834 |
| 6,292,171 B1 | * | 9/2001 | Fu et al. | 345/156 |
| 6,684,087 B1 | * | 1/2004 | Yu et al. | 455/566 |
| 2001/0003451 A1 | * | 6/2001 | Armstrong | 345/173 |
| 2004/0212617 A1 | * | 10/2004 | Fitzmaurice et al. | 345/440 |
| 2005/0195154 A1 | * | 9/2005 | Robbins et al. | 345/156 |

FOREIGN PATENT DOCUMENTS

| | | |
|---|---|---|
| JP | 6-289996 | 10/1994 |
| JP | 11-316640 | 11/1999 |
| JP | 2000-284879 | 10/2000 |
| JP | 2000-330677 | 11/2000 |
| JP | 2003-330613 | 11/2003 |
| JP | 2004-189172 | 7/2004 |

OTHER PUBLICATIONS

Japanese Patent Office Action dated Jan. 26, 2010 in Application No. 2004-208471.

Japanese Patent Office Action dated Aug. 31, 2010 in Application No. 2004-208471.

* cited by examiner

*Primary Examiner* — Quan-Zhen Wang
*Assistant Examiner* — Jennifer Nguyen
(74) *Attorney, Agent, or Firm* — Staas & Halsey LLP

(57) ABSTRACT

A pointing device that can move an object in a desired direction on a display screen includes a control unit that switches between a first mode and a second mode in accordance with the contents of the display on the display screen. In the first mode, the pointing device outputs information as to the location of the object within a pointing area. In the second mode, the pointing device divides the pointing area into a plurality of areas and outputs information as to the divided area in which the object is located.

9 Claims, 13 Drawing Sheets

1:POINTING DEVICE ical fields applied to the Hall elements 10, 11, 12, and 13 varies. As a result, the voltages that are output from the Hall elements 10, 11, 12, and 13 also vary. If the magnet 2 is tilted or moved in the positive X direction, the output voltage of the Hall element (+X direction) 10 becomes greater than the output voltage of the Hall element (−X direction) 11.

POINTING DEVICE, INFORMATION DISPLAY DEVICE, AND INPUT METHOD UTILIZING THE POINTING DEVICE

BACKGROUND OF THE INVENTION

1. Field of the Invention

The present invention generally relates to a pointing device that can designate a desired location on a display screen, and more particularly, to a pointing device that can perform various input operations, an information display system, and an input method utilizing the pointing device.

2. Description of the Related Art

A pointing device that can move a cursor or a pointer in any direction over the 360 degrees on a screen has been developed as a device for moving a cursor or a pointer displayed on the display screen of a portable terminal or the like.

The structure and the operating principles of a pointing device that utilizes variations in magnetism to move a cursor in any direction over the 360 degrees on a screen are described below.

A pointing device 1 shown in FIG. 1 utilizes variations in magnetism, and includes a magnet 2 that is housed in a housing 4 and cooperates with an operating unit (not shown) and Hall elements 3 that detect a tilt or a movement of the magnet 2. On the housing 4 that houses the magnet 2, a key top unit 5 is provided to cover the housing 4. The key top unit 5 is vertically movable and is supported by springs 6.

The Hall elements 3 are devices that convert a magnetic field into voltage and output the voltage. The Hall elements 3 are arranged symmetrically with respect to a predetermined reference point on a printed board 7, as shown in FIG. 2. For example, a Hall element (+X direction) 10 and a Hall element (−X direction) 11 are arranged in the X direction, and a Hall element (+Y direction) 12 and a Hall element (−Y direction) 13 are arranged in the Y direction.

The magnet 2 has a cylindrical shape, as shown in FIG. 2, and generates a magnetic field vertically with respect to the bottom surface. In a non-operating state, the magnet 2 is at a uniform distance from each of the Hall elements 10, 11, 12, and 13. As the magnet 2 is located at the same distance from the Hall elements 10, 11, 12, and 13, the magnetic fields applied to the respective Hall elements 10, 11, 12, and 13 are substantially the same. Accordingly, the voltages that are output from the Hall elements 10, 11, 12, and 13 are also uniform.

When the magnet 2 is operated and is then tilted or moved, each of the magnetic fields applied to the Hall elements 10, 11, 12, and 13 varies. As a result, the voltages that are output from the Hall elements 10, 11, 12, and 13 also vary. If the magnet 2 is tilted or moved in the positive X direction, the output voltage of the Hall element (+X direction) 10 becomes greater than the output voltage of the Hall element (−X direction) 11.

In accordance with the variations in the outputs of the Hall elements 10, 11, 12, and 13, a signal that can move the target object in any desired direction at a desired speed on the display screen can be calculated.

The pointing cursor control device disclosed in Japanese Unexamined Patent Publication No. 6-289996 refers to a lookup table stored in a memory, and then extracts the target coordinates of the neighboring object located in the direction of moving the cursor. A control operation is then performed to move the cursor immediately to the location represented by the extracted coordinates of the neighboring object.

With the above pointing device, the cursor can be moved in any direction over the 360 degrees on the screen. However, more complicated input operations may be necessary, depending on the application. More specifically, it is necessary to perform a pointing operation in accordance with the application screen. For example, the information as to the location of the pointing device is not necessary on the menu selecting screen, and the cursor needs to be moved only in limited directions.

Japanese Unexamined Patent Publication No. 6-289996 discloses the technique of improving the operability of the pointing device, but does not disclose the technique of performing various input operations with the pointing device.

SUMMARY OF THE INVENTION

It is therefore an object of the present invention to provide a pointing device, an information display system, and an input method in which the above disadvantage is eliminated.

A more specific object of the present invention is to provide a pointing device and an information display system that can perform various input operations, and an input method utilizing the pointing device.

The above objects of the present invention are achieved by a pointing device that can move an object in a desired direction on a display screen, comprising: a control unit that switches between a first mode and a second mode in accordance with the contents of the display on the display screen, the pointing device outputting information as to the location of the object within a pointing area in the first mode, the pointing device dividing the pointing area into a plurality of areas and outputting information as to the divided area in which the object is located in the second mode. This structure realizes various input operations and deletes unnecessary operation keys.

According to another aspect of the present invention, there is provided an information display system comprising: a pointing device that can move an object in a desired direction on a display screen, the pointing device comprising a control unit that switches between a first mode and a second mode in accordance with the contents of the display on the display screen, the pointing device outputting location information as to the object within a pointing area in the first mode, the pointing device dividing the pointing area into a plurality of areas and outputting information as to the divided area in which the object is located in the second mode; and an application screen display unit that displays a first application screen on the display screen, a plurality of menus being arranged on a circumference on the first application screen, the pointing device selecting one of the divided areas, so as to display the menus rotationally in the circumferential direction. The pointing device can realize an input for selection based on an application screen.

According to yet another aspect of the present invention, there is provided an information display system comprising: a pointing device that can move an object in a desired direction on a display screen, the pointing device comprising a control unit that switches between a first mode and a second mode in accordance with the contents of the display on the display screen, the pointing device outputting location information as to the object within a pointing area in the first mode, the pointing device dividing the pointing area into a plurality of areas and outputting information as to the divided area in which the object is located in the second mode; and an application screen display unit that displays a menu display screen on the display screen, a menu display structure in which a plurality of menu display blocks are stacked being displayed on the menu display screen, the pointing device selecting one of the divided areas, so as to move the menu display structure and place the selected menu in a predetermined position. The pointing device can realize an input for selection based on an application screen.

According to a further object of the present invention, there is provided an input method utilizing a pointing device, comprising the steps of: outputting information as to the location of an object within a pointing area on a display screen; and outputting information as to a divided area in which the object is located, the divided area being one of areas obtained by dividing the pointing area, the steps being carried out in a switching manner in accordance with the contents of the display on the display screen.

BRIEF DESCRIPTION OF THE DRAWINGS

Other objects, features and advantages of the present invention will become more apparent from the following detailed description when read in conjunction with the accompanying drawings, in which.

DESCRIPTION OF THE EMBODIMENTS

The following is a description of embodiments of the present invention, with reference to the accompanying drawings.

Figure 3:
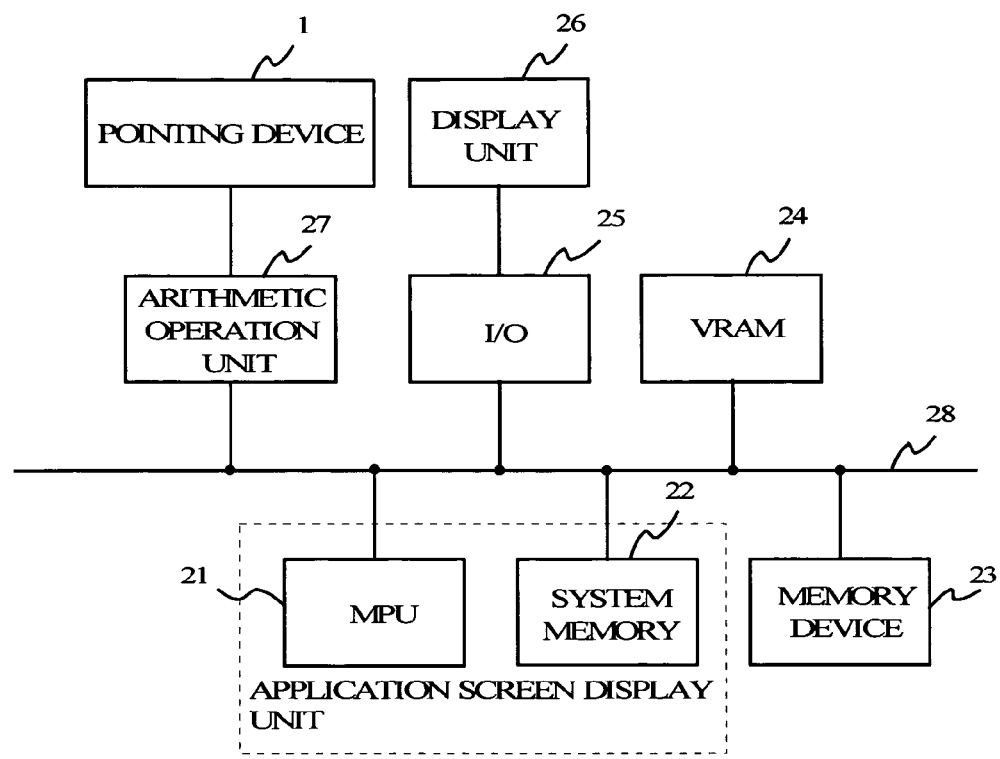
FIG. 3 illustrates the structure of a portable information terminal.

Referring to FIG. 3, a first embodiment of the present invention is described. FIG. 3 illustrates a structure in which the present invention is applied to a portable information terminal 20 such as a PDA (Personal Digital Assistants). As shown in FIG. 3, this embodiment includes a MPU (Micro Processing Unit) 21, a system memory 22, a memory device 23 such as a hard disk drive, a VRAM (Video RAM) 24, an I/O unit 25, a display unit 26, an arithmetic operation unit 27, and a pointing device 1, arranged along a bus 28.

The MPU 21 and the system memory 22 function as an application screen display unit, as the MPU 21 reads a program from the system memory 22 and executes the program. The application screen display unit embodies a graphical user interface that executes the operating system and application programs, and can readily handle files and activate application software simply by selecting an icon displayed on the screen. The operating system has the function of moving the cursor and the function of moving the focus.

The system memory 22 includes a ROM that stores system information and a RAM that is used as a temporary memory for the MPU 21.

The memory device 23 stores the operating system and the application programs. After being loaded into the system memory 22, the operation system and the application program are executed by the MPU 21. The graphic images of the buttons and the pull-down menu for realizing the GUI that accompanies the application program are also stored in the memory device 23 in advance.

The VRAM 24 stores the image of one screen to be displayed on the display unit 26. The image stored in the VRAM 24 is cyclically transmitted to the display unit 26 via the I/O unit 25 by the MPU 21 or a direct memory access controller (not shown). If the display screens need to be changed or the mouse cursor is moved, for example, the MPU 21 synthesizes a new image to be displayed and writes the image in the VRAM 24.

Figure 1:
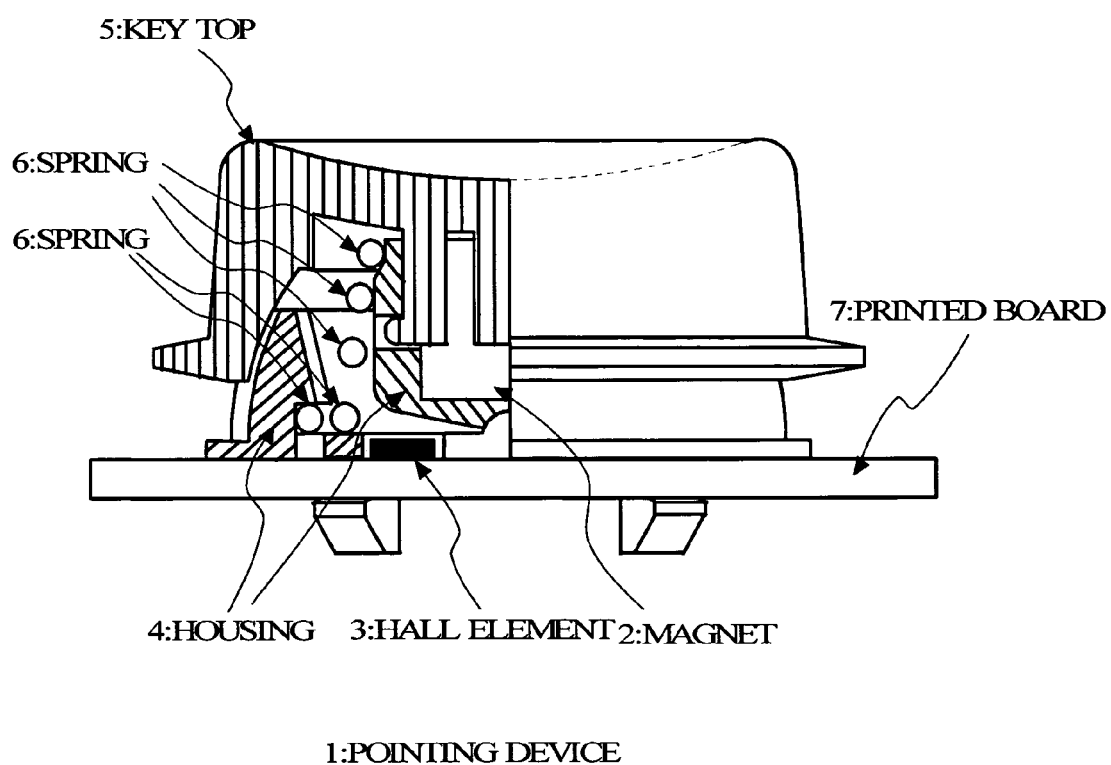
FIG. 1 illustrates the structure of a pointing device.
Figure 2:
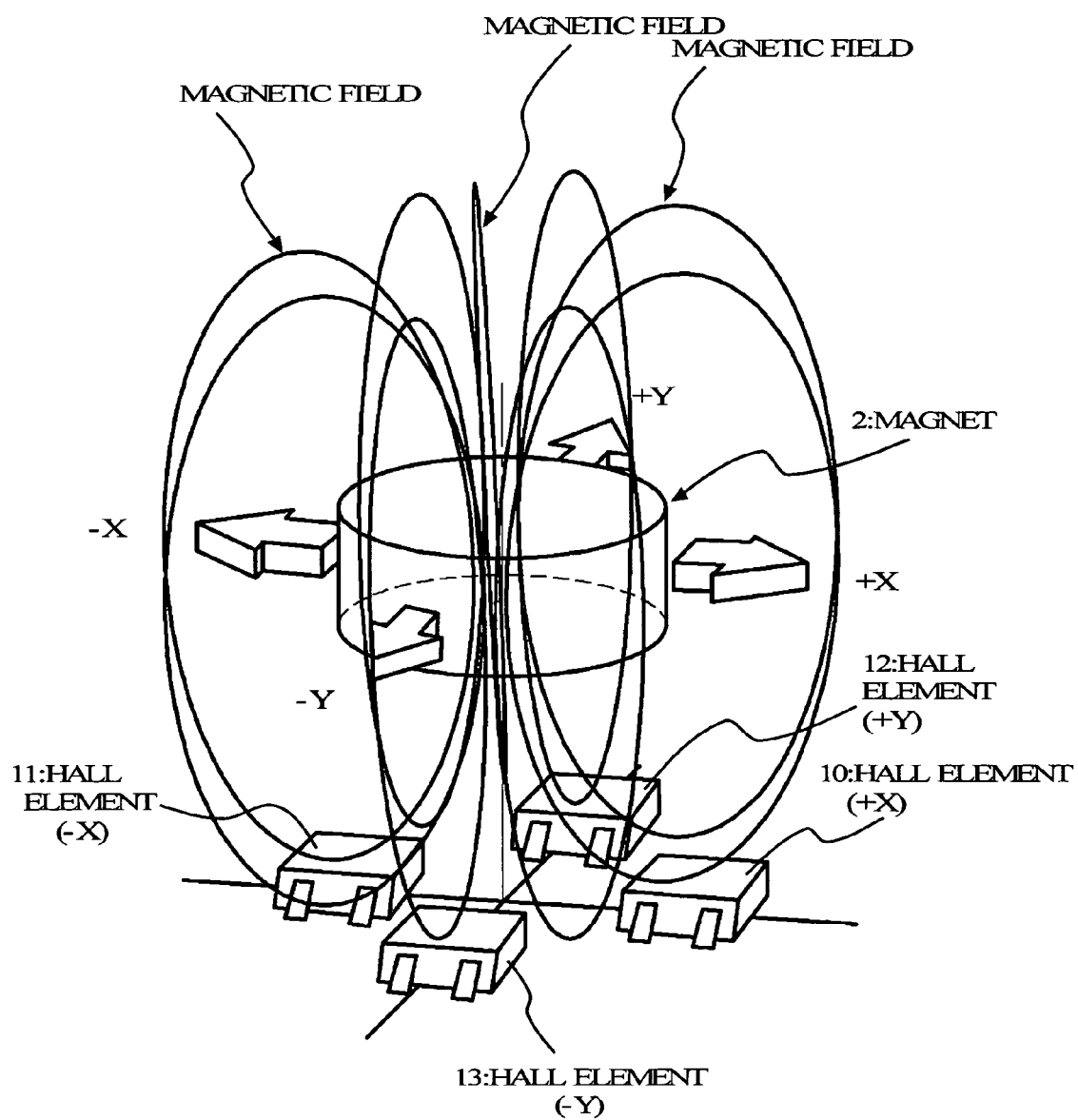
FIG. 2 illustrates the principles of the pointing device.

The pointing device 1 operates utilizing a magnetic variation, and includes a magnet 2 and Hall elements. There are four Hall elements arranged under the magnet 2: a Hall element (+X) 10, a Hall element (−X) 11, a Hall element (+Y) 12, and a Hall element (−Y) 13, as shown in FIG. 2. The magnetic field intensity detected by each of the Hall elements is converted into voltage. The voltage that is output from the Hall element (+X) 10 is (+Vx), the voltage that is output from the Hall element (−X) 11 is (−Vx), the voltage that is output from the Hall element (+Y) 12 is (+Vy), and the voltage that is output from the Hall element (−Y) 13 is (−Vy). As the pointing device 1 is operated, the location of the magnet 2 shifts, causing a change in the voltage obtained from each of the four Hall elements 10, 11, 12, and 13.

Figure 4:
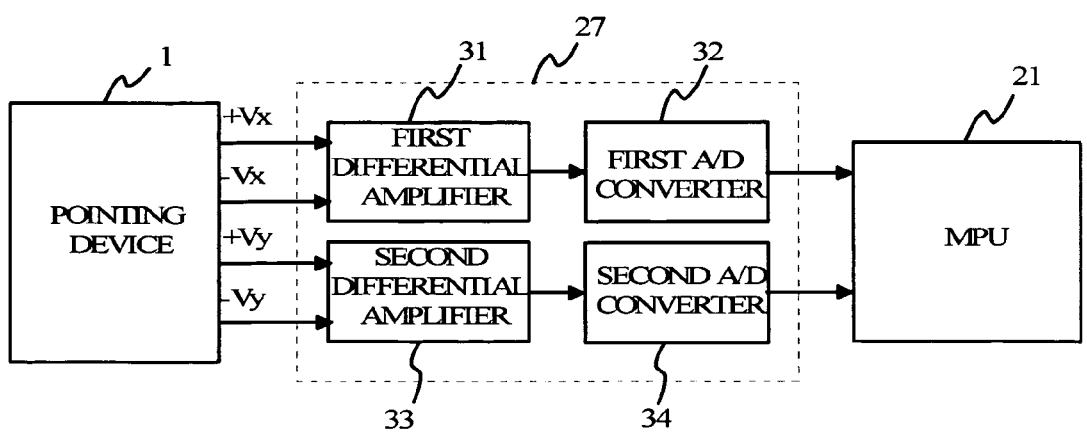
FIG. 4 illustrates the structure of the arithmetic operation unit.

FIG. 4 illustrates the structure of the arithmetic operation unit 27. As shown in FIG. 4, the arithmetic operation unit 27 includes: a first differential amplifier 31 that has the X-direction voltages (+Vx) and (−Vx) as inputs, and amplifies the difference between the voltages (+Vx) and (−Vx); a second differential amplifier 33 that has the Y-direction voltages (+Vy) and (−Vy) as inputs, and amplifies the difference between the voltages (+Vy) and (−Vy); a first ND converter 32 that converts the output of the first differential amplifier 31 into a digital signal; and a second ND converter 34 that converts the output of the second differential amplifier 33 into a digital signal.

The MPU 21 moves the cursor in the X direction or Y direction by a predetermined length on the screen of the display unit 26, every time the X pulse and the Y pulse that represent the movements of the cursor in the X and Y directions are output from the first A/D converter 32 and the second A/D converter 34, respectively. The MPU 21 adds the movements represented by the X pulse and the Y pulse to the current location of the cursor, and determines the location of the cursor or the region that contains the location of the cursor. Further, the MPU 21 determines the movements of the cursor represented by the X pulse and the Y pulse, and the scrolling speed of the application screen displayed on the display unit 26 in accordance with the location of the cursor.

Figure 5:
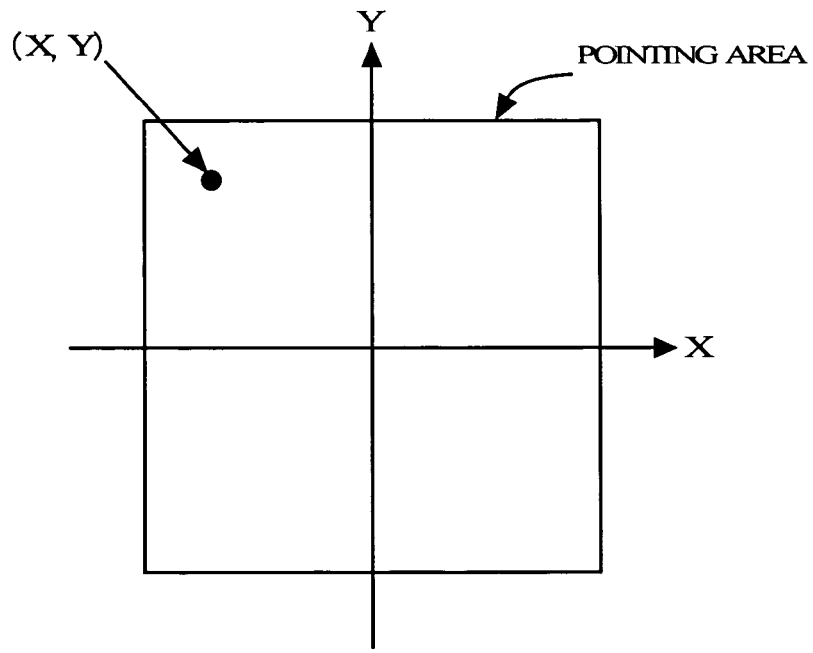
FIG. 5 illustrates an input operation using the pointing device.

In this embodiment, two or more operating inputs can be performed by the pointing device 1. First, the pointing device 1 inputs the location information (X, Y) as to the pointing area, which is the first input operation of the pointing device 1. As shown in FIG. 5, the pointing device 1 then outputs the location information (X, Y) indicating in which position the cursor is located within the pointing area. Here, the MPU 21 adds the location information to the movements obtained by the pointing device 1, so as to calculate the current location information (X, Y).

Figure 6:
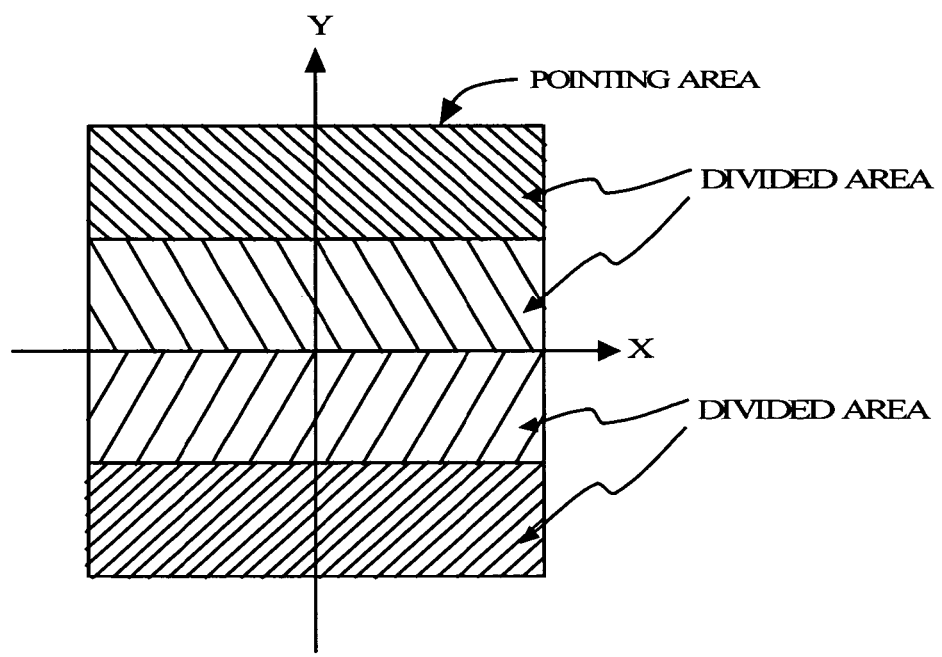
FIG. 6 illustrates an example of an arrangement of divided areas.
Figure 7:
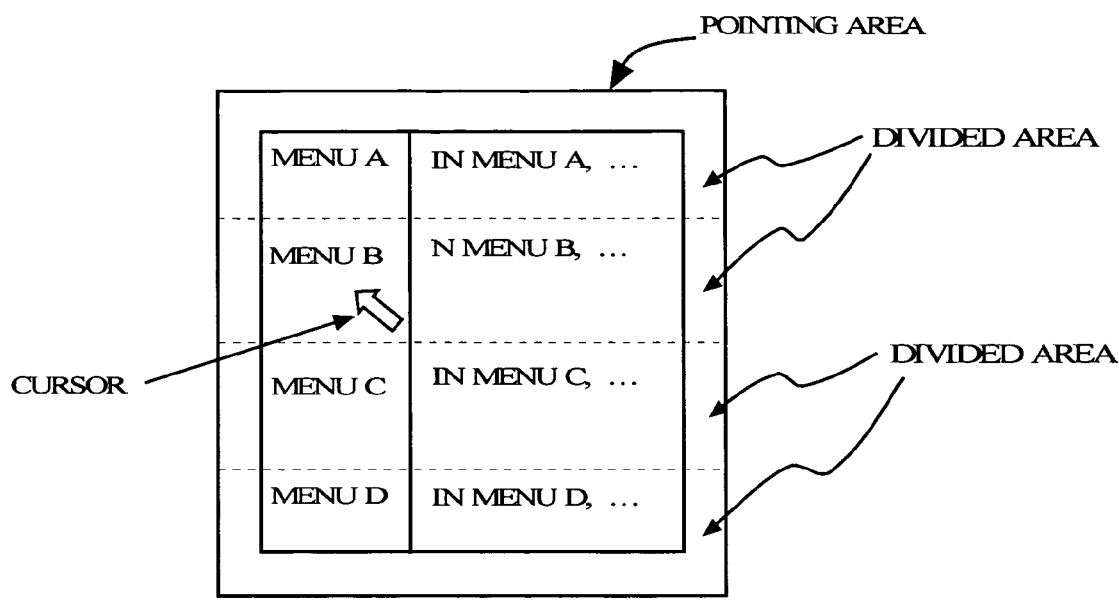
FIG. 7 illustrates an input operation using the pointing device.

As the second input operation, the pointing device 1 divides the pointing area into several areas, and outputs the area information as to the divided area in which the cursor is located. Depending on the contents of the display of a screen operation, the detailed location information as to the cursor may not be necessary. For example, when a menu is to be selected, the menu icon displayed on the screen should be selected. In the case where the detailed location information is not necessary, the pointing area is divided into several divided areas, and the pointing device 1 outputs the information as to the divided area in which the pointing position designated by the pointing device 1 is located. FIG. 6 illustrates the four divided areas that are formed by dividing the pointing area in the directions parallel to the X axis. If the pointing area is divided as shown in FIG. 6, menu selection columns are provided in directions parallel to the Y axis, as shown in FIG. 7. In such a case, the pointing device 1 selects a divided area to select a desired menu.

Figure 8:
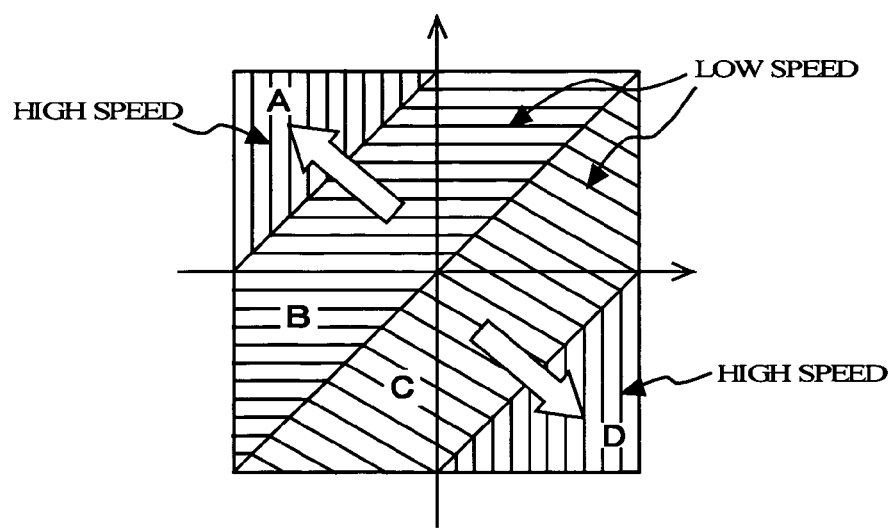
FIG. 8 illustrates an input operation using the pointing device.

It is also possible to perform a different input operation for each divided area. For example, as shown in FIG. 8, the pointing area may be diagonally divided into four divided areas A, B, C, and D. When the cursor is moved into the area B or C that is located in the center of the pointing area, the application screen is scrolled at a low speed. When the cursor is moved into the area A or D that is located at a distance from the center of the pointing area, the application screen is scrolled at a high speed. The scrolling direction of the application screen differs between when the cursor is located in the divided area A or B and when the cursor is located in the divided area C or D.

Figure 9:
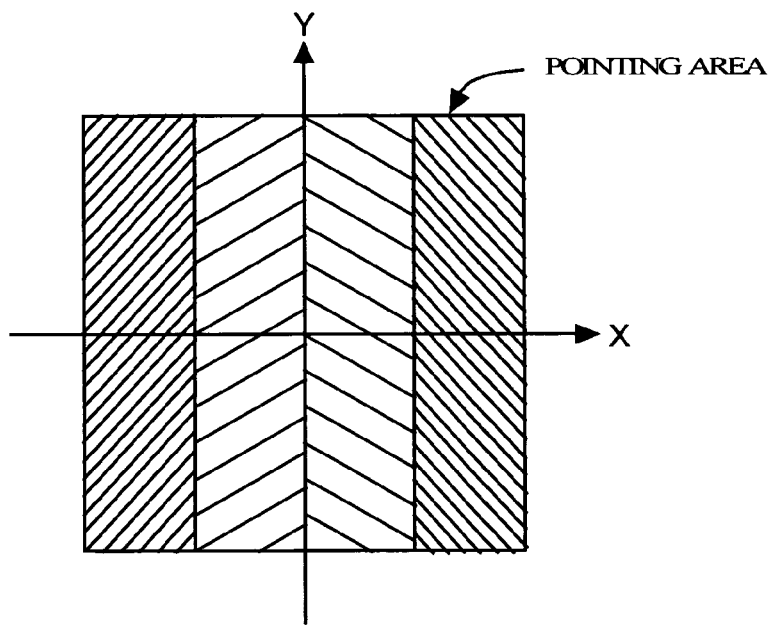
FIG. 9 illustrates an input operation using the pointing device.

In the first dividing example shown in FIG. 6, the pointing area is divided into the four areas that are in parallel with one another in the X-axis direction. In the second dividing example shown in FIG. 9, the pointing area is divided into four areas that are in parallel with one another in the Y-axis direction. However, the number of divided areas is not limited to four, and it is possible to reduce or increase the number of divided areas, depending on the application screen.

Figure 10:
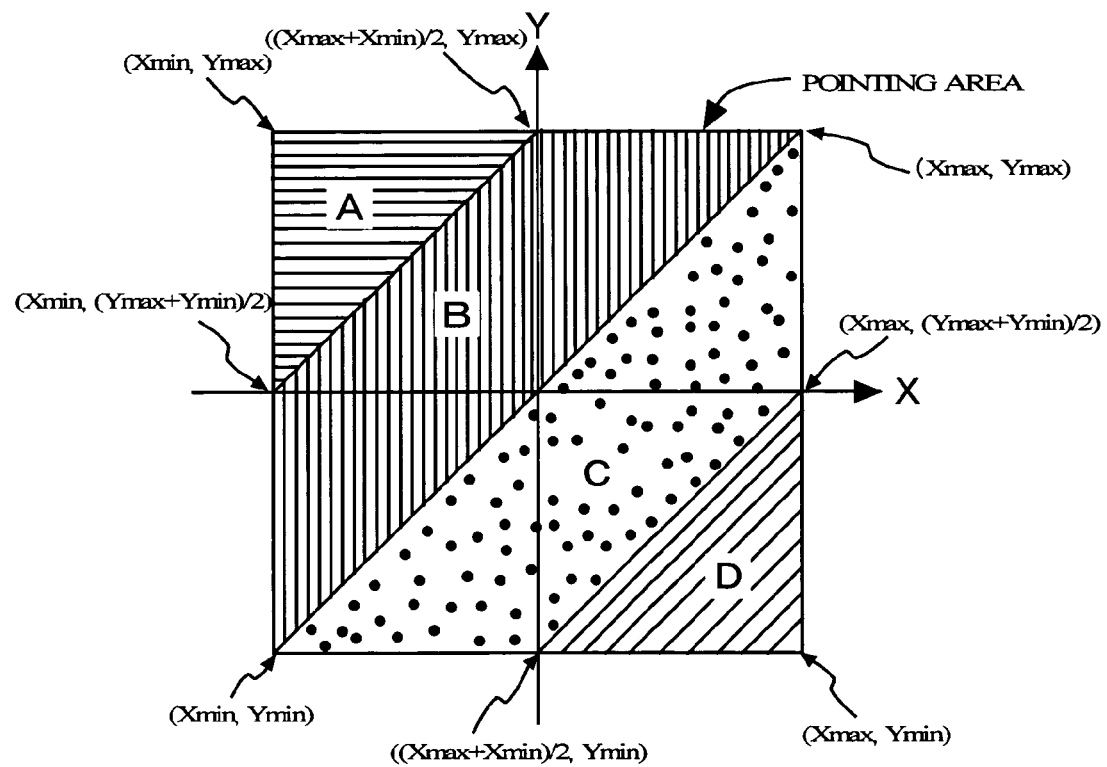
FIG. 10 illustrates another example of an arrangement of divided areas.

FIG. 10 illustrates the third dividing example. In this example, the pointing area is diagonally divided into four areas, as shown in FIG. 10. In the third dividing example, the maximum position in the X-axis direction is Xmax, the minimum position in the X-axis direction is Xmin, the maximum position in the Y-axis direction is Ymax, and the minimum position in the Y-axis direction is Ymin. The area formed by the point (Xmin, Ymax), the point ((Xmax+Xmin)/2, Ymax), and the point (Xmin, (Ymax+Ymin)/2) is set as the first area. This area is hereinafter referred to as the area A. The area formed by the point ((Xmax+Xmin)/2, Ymax), the point (Xmax, Ymax), the point (Xmin, Ymin), and the point (Xmin, (Ymax+Ymin)/2) is set as the second area. This area is hereinafter referred to as the area B. The area formed by the point (Xmax, Ymax), the point (Xmin, Ymin), the point ((Xmax+Xmin)/2, Ymin), and the point (Xmax, (Ymax+Ymin)/2) is set as the third area. This area is hereinafter referred to as the area C. The area formed by the point (Xmax, (Ymax+Ymin)/2), the point (Xmax, Ymin), and the point ((Xmax+Xmin)/2, Ymin) is set as the fourth area. This area is hereinafter referred to as the area D.

Figure 11:
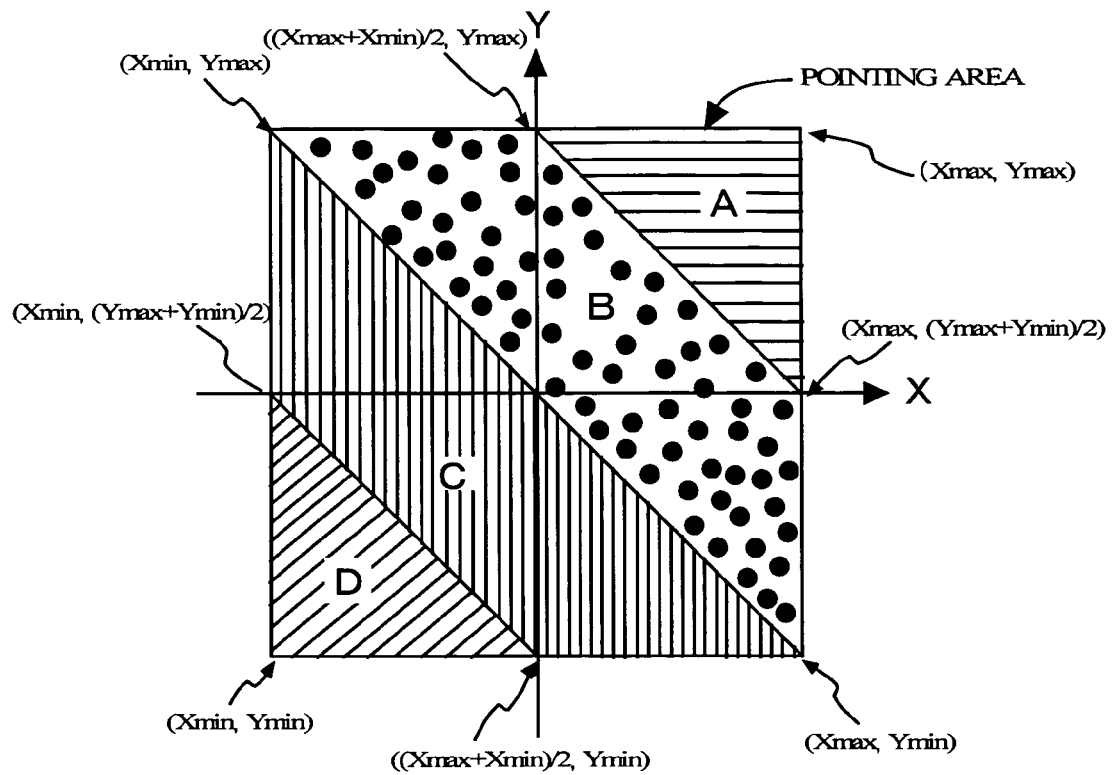
FIG. 11 illustrates yet another example of an arrangement of divided areas.

FIG. 11 illustrates the fourth dividing example. In this example, the pointing area is also diagonally divided into four areas, as shown in FIG. 11. In the fourth dividing example, the maximum position in the X-axis direction is Xmax, the minimum position in the X-axis direction is Xmin, the maximum position in the Y-axis direction is Ymax, and the minimum position in the Y-axis direction is Ymin. The area formed by the point (Xmax, Ymax), the point ((Xmax+Xmin)/2, Ymax), and the point (Xmax, (Ymax+Ymin)/2) is set as the first area. This area is hereinafter referred to as the area A. The area formed by the point ((Xmax+Xmin)/2, Ymax), the point (Xmax, (Ymax+Ymin)/2), the point (Xmin, Ymax), and the point (Xmax, Ymin) is set as the second area. This area is hereinafter referred to as the area B. The area formed by the point (Xmin, Ymax), the point (Xmax, Ymin), the point (Xmin, (Ymax+Ymin)/2), and the point ((Xmax+Xmin)/2, Ymin) is set as the third area. This area is hereinafter referred to as the area C. The area formed by the point (Xmin, (Ymin+Ymax)/2), the point ((Xmin+Xmax)/2, Ymin), and the point (Xmin, Ymin) is set as the fourth area. This area is hereinafter referred to as the area D.

Figure 12:
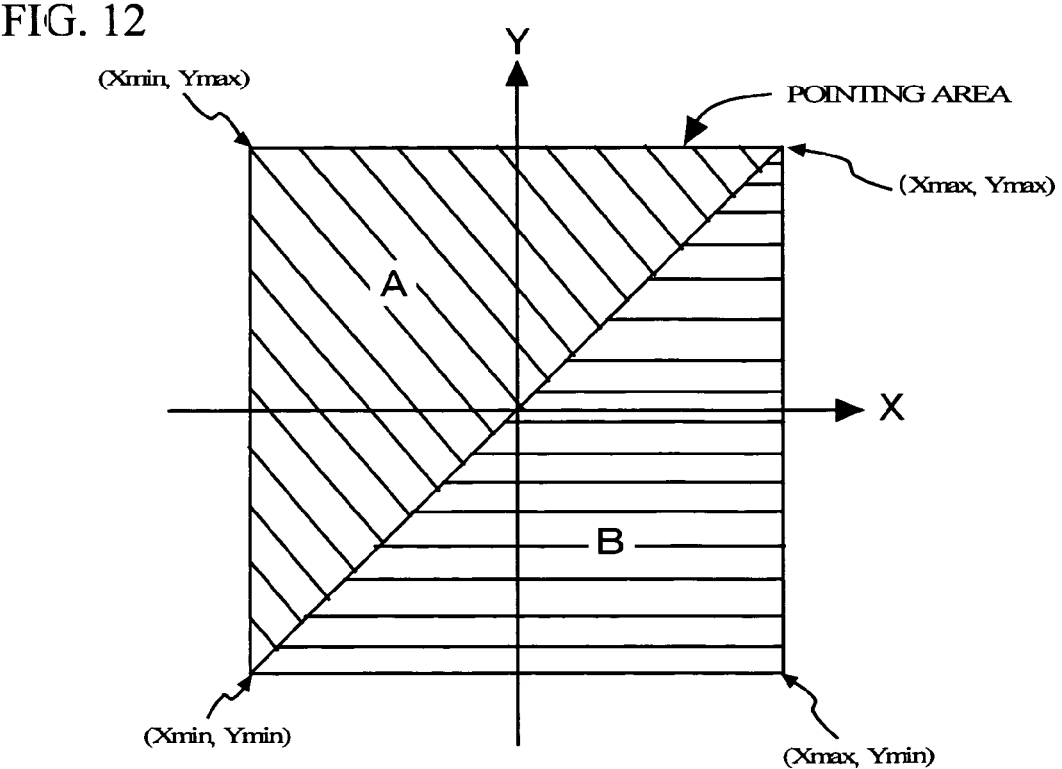
FIG. 12 illustrates still another example of an arrangement of divided areas.

FIG. 12 illustrates the fifth dividing example. In this example, the pointing area is diagonally divided into two areas, as shown in FIG. 12. The maximum position in the X-axis direction is Xmax, the minimum position in the X-axis direction is Xmin, the maximum position in the Y-axis direction is Ymax, and the minimum position in the Y-axis direction is Ymin. The area formed by the point (Xmax, Ymax), the point (Xmin, Ymax), and the point (Xmin, Ymin) is set as the first area. This area is hereinafter referred to as the area A. The area formed by the point (Xmax, Ymax), the point (Xmin, Ymin), and the point (Xmax, Ymin) is set as the second area. This area is hereinafter referred to as the area B.

Figure 13:
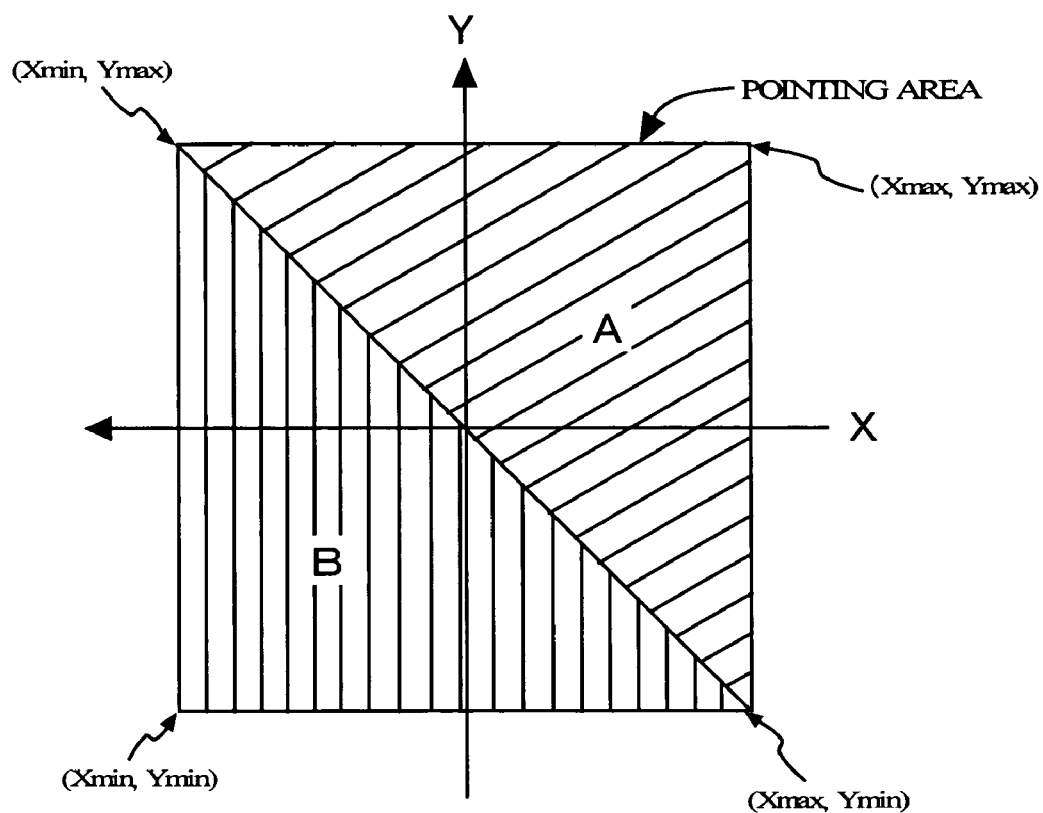
FIG. 13 illustrates yet another example of an arrangement of divided areas.

FIG. 13 illustrates the sixth dividing example. In this example, the pointing area is also diagonally divided into two areas, as shown in FIG. 13. The maximum position in the X-axis direction is Xmax, the minimum position in the X-axis direction is Xmin, the maximum position in the Y-axis direction is Ymax, and the minimum position in the Y-axis direction is Ymin. The area formed by the point (Xmax, Ymax), the point (Xmin, Ymax), and the point (Xmax, Ymin) is set as the first area. This area is hereinafter referred to as the area A. The area formed by the point (Xmin, Ymax), the point (Xmax, Ymin), and the point (Xmin, Ymin) is set as the second area. This area is hereinafter referred to as the area B.

Although the above dividing examples are preferred dividing examples of the pointing area in the present invention, there should be many other variations of screen dividing, depending on the structure of the application screen.

Figure 14:
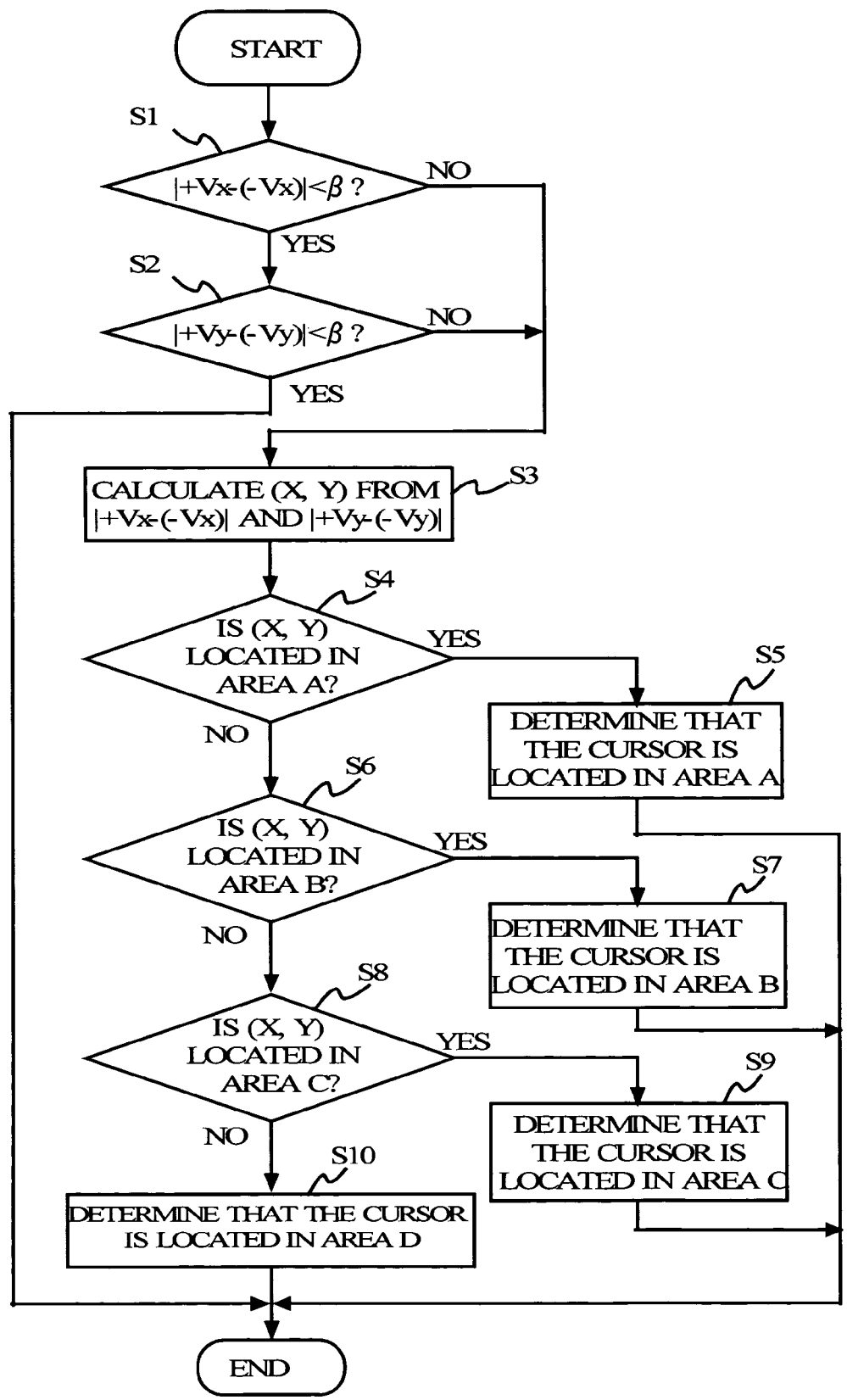
FIG. 14 is a flowchart of the operation of determining the divided area in which the cursor is located.

Referring now to the flowchart of FIG. 14, the operation of determining the area in which the cursor is located in accordance with the output of the pointing device 1 is described. The output voltage of the Hall element (+X) 10 provided in the +X-axis direction is (+Vx), the output voltage of the Hall element (−X) 11 provided in the −X-axis direction is (−Vx), the output voltage of the Hall element (+Y) 12 provided in the +Y-axis direction is (+Vy), and the output voltage of the Hall element (−Y) 13 provided in the −Y-axis direction is (−Vy). The arithmetic operation unit 27 calculates the output voltages (+Vx), (−Vx), (+Vy), and (−Vy) of the pointing device 1, and determines the movements in the X-axis direction and the Y-axis direction. Here, the movement in the X-axis direction is |+Vx−(−Vx)|, and the movement in the Y-axis direction is |+Vy−(−Vy)|. The MPU 21 compares each of the movements with a predetermined threshold value β (steps S1 and S2) so as to determine whether the cursor has moved. If there is no movement of the cursor ("YES" in each of steps S1 and S2), the operation simply comes to an end.

If there is a movement of the cursor, the movement in the X-axis direction and the movement in the Y-axis direction are added to the location information, so as to obtain the current location information (X, Y) of the cursor (step S3). Based on the current location information (X, Y), the area in which the cursor is located is determined. If the cursor is determined to be located in the area A ("YES" in step S4), the determination signal that indicates the cursor is located in the area A is output (step S5). If the cursor is determined to be located in the area B ("YES" in step S6), the determination signal that indicates the cursor is located in the area B is output (step S7). If the cursor is determined to be located in the area C ("YES" in step S8), the determination signal that indicates the cursor is located in the area C is output (step S9). If the cursor is determined not to be located in the area C ("NO" in step S8), the determination signal that indicates the cursor is located in the area D is output (step S10).

Figure 15:
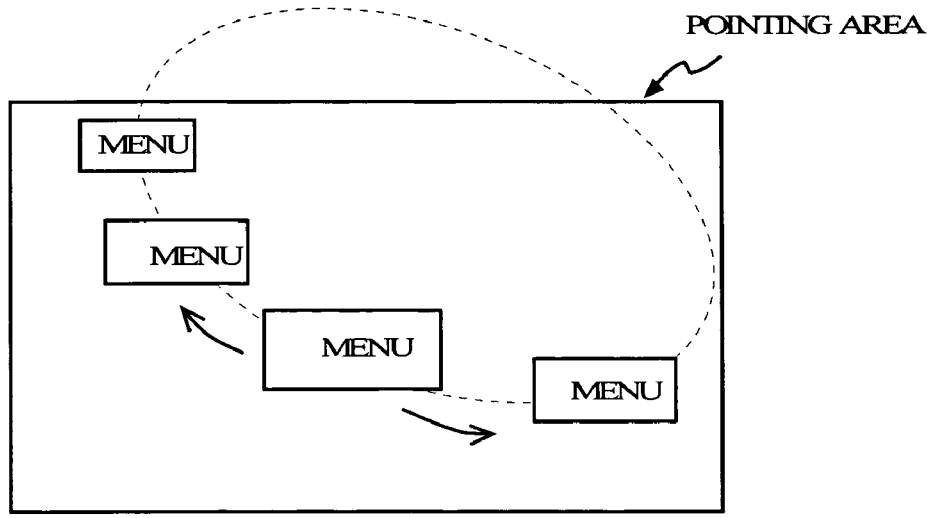
FIG. 15 is an example of the application screen to be displayed on the display screen.
Figure 16:
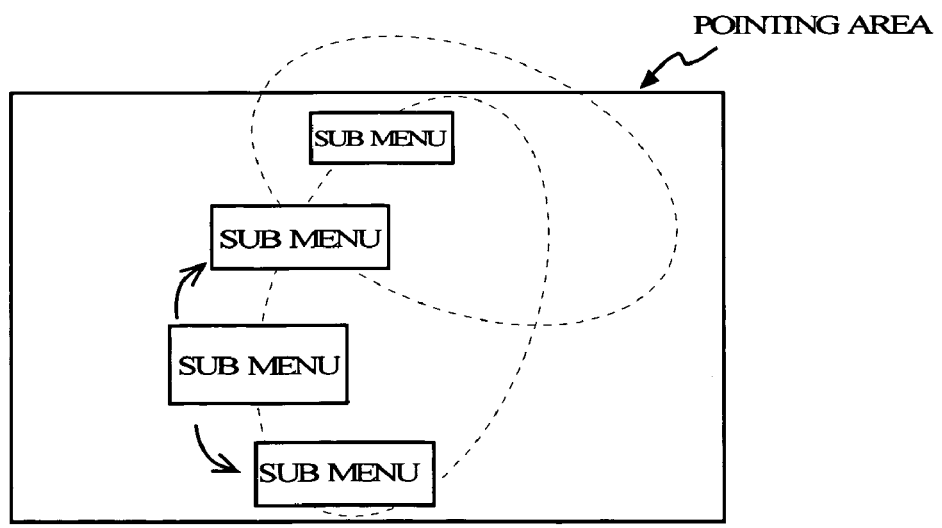
FIG. 16 is another example of the application screen to be displayed on the display screen.

Next, an example operation of selecting a menu through an input process using divided pointing areas is described. The menu selecting screen shown in FIG. 15 is displayed on the display screen through an arithmetic operation of the MPU 21. Several menus are arranged on a circumference on the menu selecting screen shown in FIG. 15. For example, in the case where the portable information terminal 20 can be connected to the Internet, the contents that have been selected in the past are displayed as menus. Alternatively, the menus for selecting the functions provided in the portable information terminal 20 may be displayed. These menus are rotated through a pointing operation performed by a user. After one of the menus is selected, sub menus corresponding to the selected main menu are displayed as shown in FIG. 16. The sub menus are arranged on a circumference that crosses the circumference of the main menus at right angles. The pointing device 1 is operated in the direction perpendicular to the pointing direction of the menus, so that the sub menus are rotated.

Figure 17:
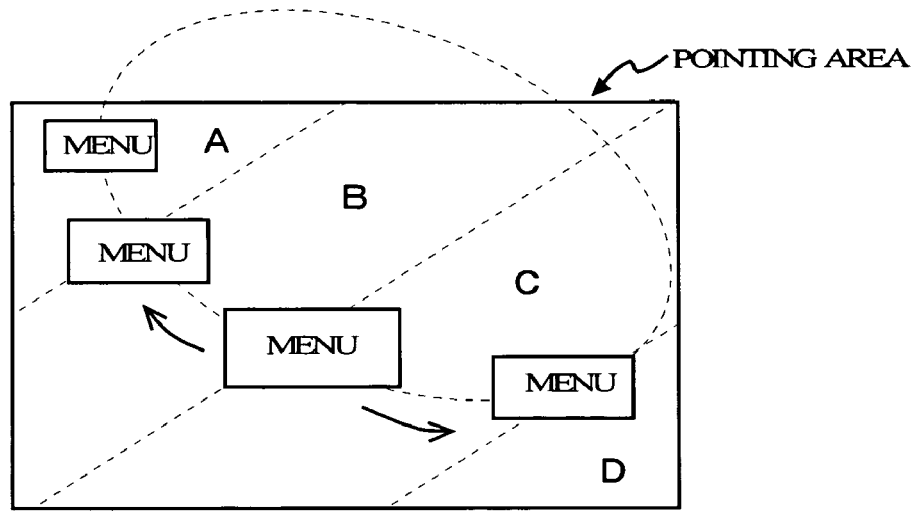
FIG. 17 illustrates the technique of selecting a desired menu, using the pointing device.

Referring now to FIG. 17, the operation of selecting a menu from the menu selecting screen shown in FIG. 15 is described. For example, the pointing area shown in FIG. 17 is divided into four areas A, B, C, and D in conformity with the menu selecting screen. When a user moves the cursor toward the areas A and B, the menus are rotated to the left, and the menu that is located in the center of the screen is replaced with the next one. When the cursor is moved toward the areas C and D, the menus are rotated to the right, and the menu that is located in the center of the screen is replaced with the next one. The menu rotating speed in the area A is different from the menu rotating speed in the area B. When the cursor is moved into the divided area B, the menus are rotated at a low speed. When the cursor is moved into the divided area A, the menus are rotated at a high speed. The menu rotating speed in the divided area C also differs from the menu rotating speed in the divided area D.

Figure 18:
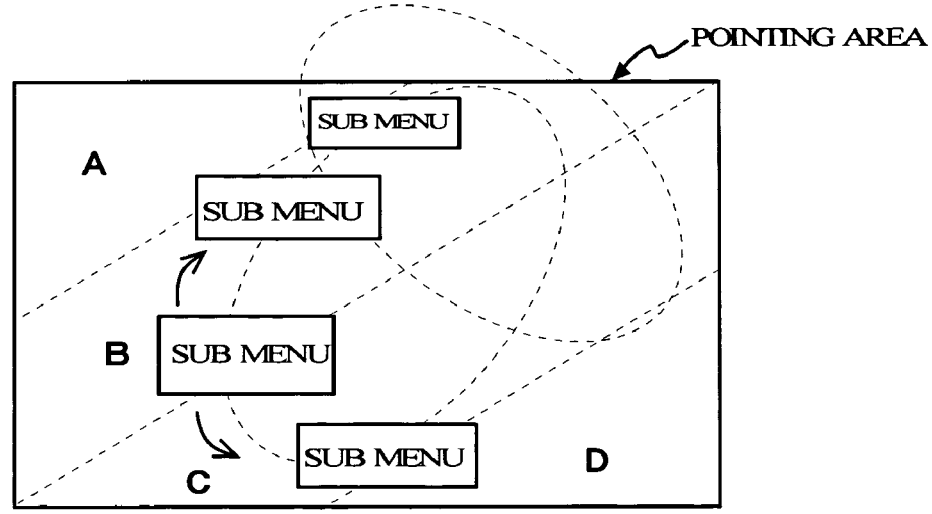
FIG. 18 illustrates the technique of selecting a desired sub menu, using the pointing device.
Figure 19:
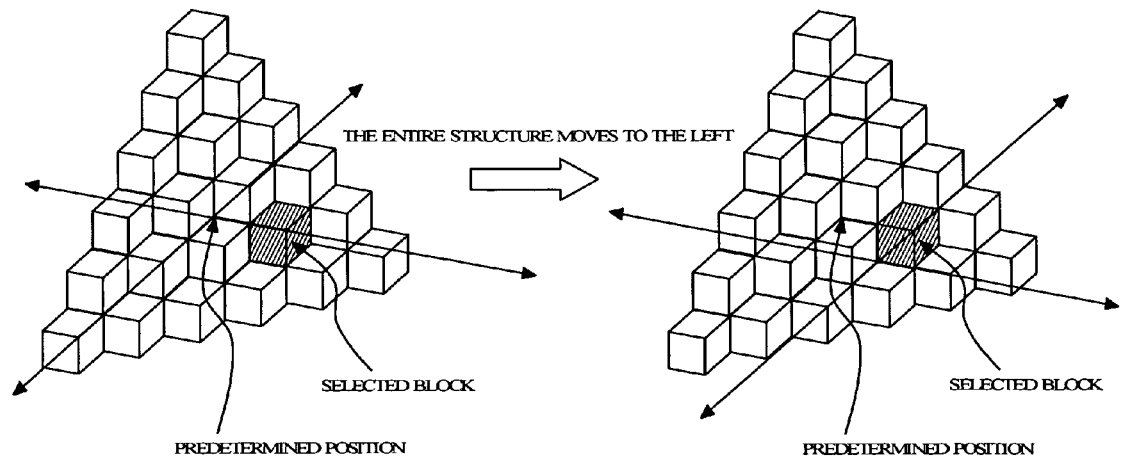
FIG. 19 illustrates an example of an application screen to be displayed on the display screen.
Figure 20:
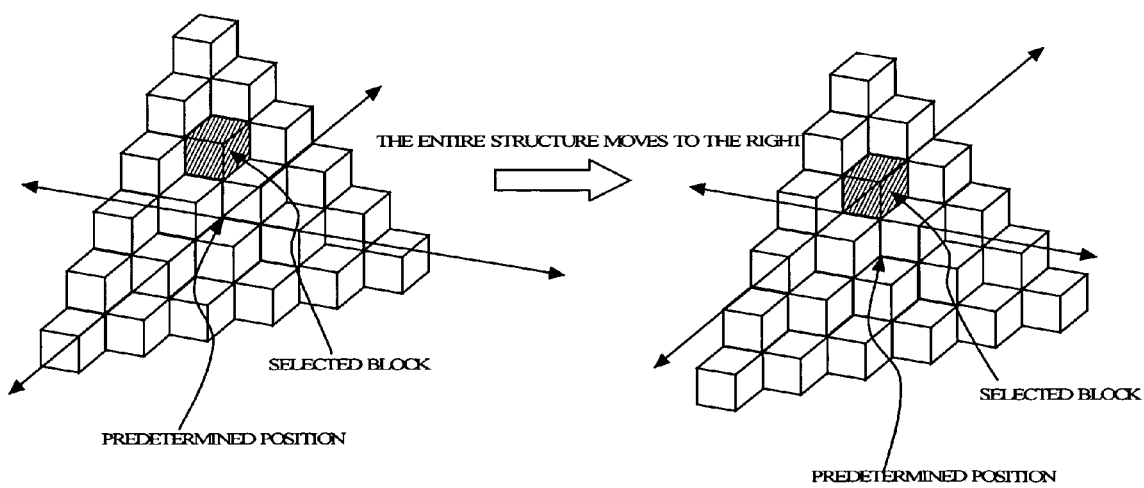
FIG. 20 illustrates another example of an application screen to be displayed on the display screen.
Figure 21:
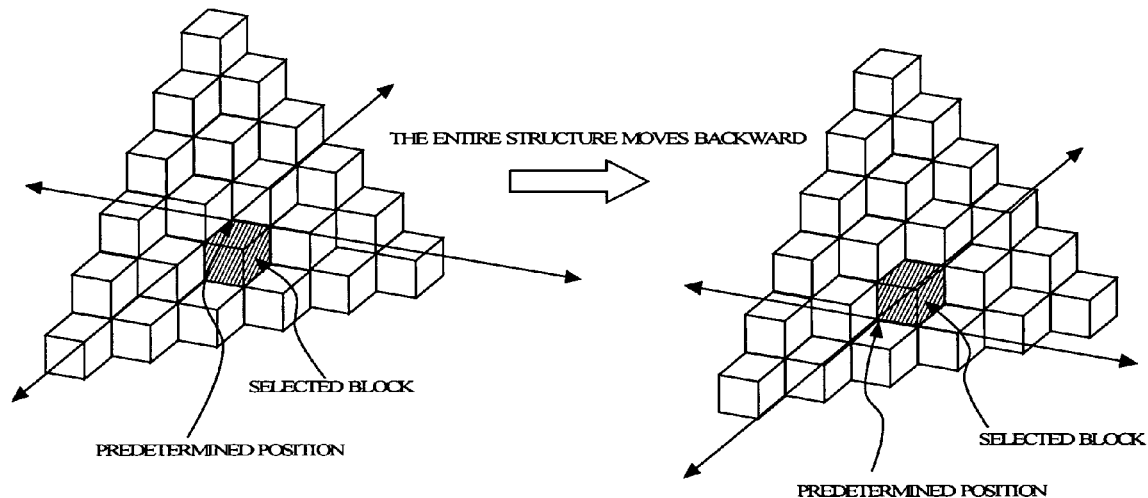
FIG. 21 illustrates yet another example of an application screen to be displayed on the display screen.
Figure 22:
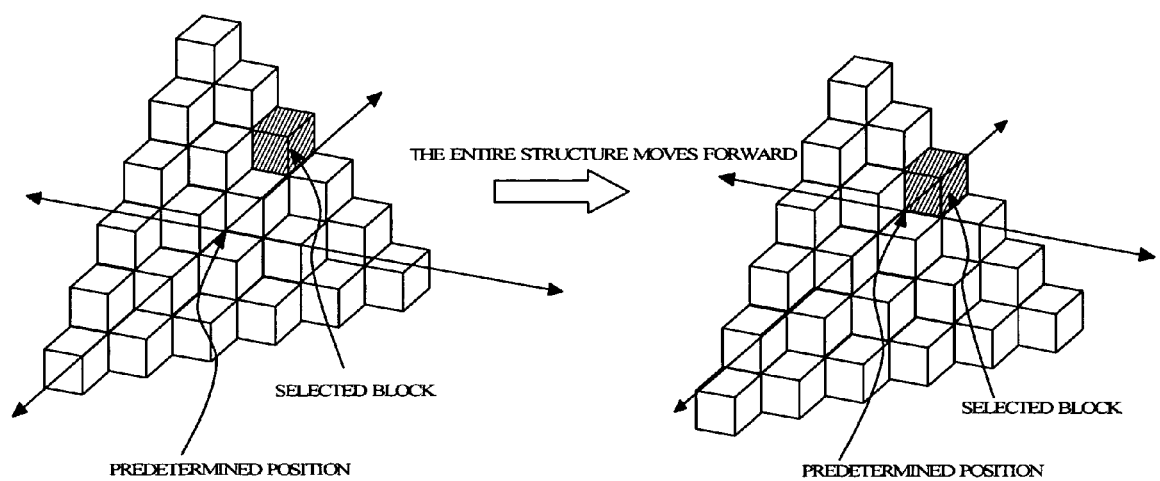
FIG. 22 illustrates still another example of an application screen to be displayed on the display screen.

A user rotates the menus so as to place the desired menu in the center of the screen. As the desired menu is selected, the sub menu selecting screen corresponding to the selected menu is displayed. Since the sub menus are arranged in the circumferential direction that is perpendicular to the circumferential direction of the menus, the pointing area is also changed accordingly, as shown in FIG. 18. The same operation as above is performed on the sub menu selecting screen, so as to select the menu to be displayed on the screen.

Another example of the menu selecting operation utilizing divided pointing areas is now described. On the menu selecting screen of this example, a cube or a rectangular parallelepiped is regarded as one menu block, and the front surface, a side surface, and the top surface of each cube or each rectangular parallelepiped are three-dimensionally displayed, as shown in FIGS. 19 through 22. In this example, a desired menu is selected on the menu display structure that is formed by stacking menu blocks each having the above structure.

When a user selects one of the menus from the menu display structure, the menu display structure is moved so as to place the selected menu block to a predetermined position (the center of the pointing area in this example). Through the operation of the pointing device, the entire menu display structure is moved. For example, as one of the divided areas shown in FIGS. 10 through 13 is selected, the desired menu block is moved to the predetermined position. Thus, the desired function is selected. Since the selected block is located on the right side of the predetermined position in FIG. 19, the entire menu display structure is moved to the left in that case. Since the selected block is located on the left of the predetermined position in FIG. 20, the entire menu display structure is moved to the right in that case. Since the selected block is located on the front side of the predetermined position in FIG. 21, the entire menu display structure is moved backward in that case. Since the selected block is located on the back side of the predetermined position in FIG. 22, the entire menu display structure is moved forward in that case.

As described above, the pointing device 1 of this embodiment has the function of outputting the information as to the location of the cursor within the pointing area, and the function of outputting the information as to the divided area in which the cursor is located. Accordingly, the pointing device 1 can perform various input operations, and unnecessary operation keys can be removed. Also, the divided areas are changed in accordance with the contents of the display on the application screen, so that the input operation suitable for the contents of the display can be performed.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, the present invention is applied to a portable information terminal in the above-described embodiments, but it is also possible to apply the present invention to a portable telephone device, or the like.

The present invention is based on Japanese Patent Application No. 2004-208471 filed on Jul. 15, 2004, the entire disclosure of which is hereby incorporated by reference.

What is claimed is:

1. A device that can move an object in a desired direction on a display screen, comprising:
    a control unit that switches between a first mode and a second mode in accordance with the contents of the display on the display screen, a pointing device outputting information as to a location of the object within a pointing area in the first mode, the pointing device dividing the pointing area into a plurality of areas and outputting information as to the divided area in which the object is located in the second mode, wherein the divided areas include a first area that is formed by the three corner points (Xmin, Ymax), ((Xmax+Xmin)/2, Ymax), and (Xmin, (Ymax+Ymin)/2), a second area that is formed by the four corner points ((Xmax+Xmin)/2, Ymax), (Xmax, Ymax), (Xmin, Ymin), and (Xmin, (Ymax+Ymin)/2), a third area that is formed by the four corner points (Xmax, Ymax), (Xmin, Ymin), ((Xmin+Xmax)/2, Ymin), and (Xmax, (Ymax+Ymin)/2), and a fourth area that is formed by the three corner points (Xmax, (Ymax+Ymin)/2), (Xmax, Ymin), and ((Xmax+Xmin)/2, Ymin), with the maximum position of the pointing area in the X-axis direction being Xmax, the minimum position in the X-axis direction being Xmin, the maximum position in the Y-axis direction being Ymax, and the minimum position in the Y-axis direction being Ymin, and wherein when the object is moved from the second area to the first area, the display screen is scrolled at a speed faster than when the object is moved from the first area to the second area, and when the object is moved from the third area to the fourth area, the display screen is scrolled at a speed faster than when the object is moved from the fourth area to the third area.

2. The device as claimed in claim 1, wherein the control unit changes the divided areas in accordance with the contents of the display on the display screen in the second mode.

3. The device as claimed in claim 1, wherein the divided areas are formed by dividing the pointing area in a direction that is parallel to the X axis or the Y axis.

4. The device as claimed in claim 1, wherein a scrolling direction of the display screen differs between when the object is located in the first area and second area than when the object is located in the third area and the fourth area.

5. A device that can move an object in a desired direction on a display screen, comprising:

a control unit that switches between a first mode and a second mode in accordance with the contents of the display on the display screen, a pointing device outputting information as to a location of the object within a pointing area in the first mode, the pointing device dividing the pointing area into a plurality of areas and outputting information as to the divided area in which the object is located in the second mode, wherein the divided areas include a first area that is formed by the three corner points (Xmax, Ymax), ((Xmax+Xmin)/2, Ymax), and (Xmax, (Ymax+Ymin)/2), a second area that is formed by the four corner points ((Xmax+Xmin)/2, Ymax), (Xmax, (Ymax+Ymin)/2), (Xmin, Ymax), and (Xmax, Ymin), a third area that is formed by the four corner points (Xmin, Ymax), (Xmax, Ymin), (Xmin, (Ymax+Ymin)/2), and ((Xmax+Xmin)/2, Ymin), and a fourth area that is formed by the three corner points (Xmin, (Ymax+Ymin)/2), ((Xmax+Xmin)/2, Ymin), and (Xmin, Ymin), with the maximum position of the pointing area in the X-axis direction being Xmax, the minimum position in the X-axis direction being Xmin, the maximum position in the Y-axis direction being Ymax, and the minimum position in the Y-axis direction being Ymin, and wherein when the object is moved from the second area to the first area, the display screen is scrolled at a speed faster than when the object is moved from the first area to the second area, and when the object is moved from the third area to the fourth area, the display screen is scrolled at a speed faster than when the object is moved from the fourth area to the third area.

6. The device as claimed in claim 5, wherein the control unit changes the divided areas in accordance with the contents of the display on the display screen in the second mode.

7. The device as claimed in claim 5, wherein the divided areas are formed by dividing the pointing area in a direction that is parallel to the X axis or the Y axis.

8. An input method for selecting a position on a display screen including an operation, comprising:

forming a pointing device that controls movement of a cursor on the display screen;

forming a pointing area on the display screen and dividing the pointing area into a plurality of divided areas;

outputting information as to a location of a cursor within the pointing area on the display screen; and outputting information as to which one of the divided areas the cursor is located, the operation being carried out in a switching manner in accordance with a contents of a display on the display screen, wherein the divided areas are formed to include a first area that is formed by the three corner points (Xmin, Ymax), ((Xmax+Xmin)/2, Ymax), and (Xmin, (Ymax+Ymin)/2), a second area that is formed by the four corner points ((Xmax+Xmin)/2, Ymax), (Xmax, Ymax), (Xmin, Ymin), and (Xmin, (Ymax+Ymin)/2), a third area that is formed by the four corner points (Xmax, Ymax), (Xmin, Ymin), ((Xmin+Xmax)/2, Ymin), and (Xmax, (Ymax+Ymin)/2), and a fourth area that is formed by the three corner points (Xmax, (Ymax+Ymin)/2), (Xmax, Ymin), and ((Xmax+Xmin)/2, Ymin), with the maximum position of the pointing area in the X-axis direction being Xmax, the minimum position in the X-axis direction being Xmin, the maximum position in the Y-axis direction being Ymax, and the minimum position in the Y-axis direction being Ymin, and wherein when the object is moved from the second area to the first area, the display screen is scrolled at a speed faster than when the object is moved from the first area to the second area, and when the object is moved from the third area to the fourth area, the display screen is scrolled at a speed faster than when the object is moved from the fourth area to the third area.

9. An input method for selecting a position on a display screen including an operation, comprising:

forming a pointing device that controls movement of a cursor on the display screen;

forming a pointing area on the display screen and dividing the pointing area into a plurality of divided areas;

outputting information as to a location of a cursor within the pointing area on the display screen; and outputting information as to which one of the divided areas the cursor is located, the operation being carried out in a switching manner in accordance with a contents of a display on the display screen, wherein the divided areas are formed to include a first area that is formed by the three corner points ($X_{max}$, $Y_{max}$), (($X_{max}+X_{min}$)/2, $Y_{max}$), and ($X_{max}$, ($Y_{max}+Y_{min}$)/2), a second area that is formed by the four corner points (($X_{max}+X_{min}$)/2, $Y_{max}$), ($X_{max}$, ($Y_{max}+Y_{min}$)/2), ($X_{min}$, $Y_{max}$), and ($X_{max}$, $Y_{min}$), a third area that is formed by the four corner points ($X_{min}$, $Y_{max}$), ($X_{max}$, $Y_{min}$), ($X_{min}$, ($Y_{max}+Y_{min}$)/2), and (($X_{max}+X_{min}$)/2, $Y_{min}$), and a fourth area that is formed by the three corner points ($X_{min}$, ($Y_{max}+Y_{min}$)/2), (($X_{max}+X_{min}$)/2, $Y_{min}$), and ($X_{min}$, $Y_{min}$), with the maximum position of the pointing area in the X-axis direction being $X_{max}$, the minimum position in the X-axis direction being $X_{min}$, the maximum position in the Y-axis direction being $Y_{max}$, and the minimum position in the Y-axis direction being $Y_{min}$, and wherein when the object is moved from the second area to the first area, the display screen is scrolled at a speed faster than when the object is moved from the first area to the second area, and when the object is moved from the third area to the fourth area, the display screen is scrolled at a speed faster than when the object is moved from the fourth area to the third area.

* * * * *